(12) United States Patent
Choi

(10) Patent No.: US 7,471,351 B2
(45) Date of Patent: Dec. 30, 2008

(54) REPAIR STRUCTURE FOR LIQUID CRYSTAL DISPLAY AND METHOD OF REPAIRING THE SAME

(75) Inventor: Woo Hyuk Choi, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 848 days.

(21) Appl. No.: 09/843,781

(22) Filed: Apr. 30, 2001

(65) Prior Publication Data
US 2001/0035920 A1 Nov. 1, 2001

(30) Foreign Application Priority Data
May 1, 2000 (KR) .............................. 2000-23332

(51) Int. Cl.
- G02F 1/1333 (2006.01)
- G02F 1/1343 (2006.01)
- G02F 1/13 (2006.01)

(52) U.S. Cl. .......................... 349/54; 349/139; 349/192
(58) Field of Classification Search ................... 349/54, 349/46, 55, 139, 192, 193, 149
See application file for complete search history.

(56) References Cited

U.S. PATENT DOCUMENTS

| | | | | |
|---|---|---|---|---|
| 5,303,074 A | * | 4/1994 | Salisbury | ...................... 359/59 |
| 5,407,710 A | * | 4/1995 | Baum et al. | .................. 427/534 |
| 5,459,410 A | * | 10/1995 | Henley | ........................ 324/770 |
| 5,552,607 A | * | 9/1996 | Salisbury et al. | ........ 250/370.09 |
| 5,608,245 A | * | 3/1997 | Martin | ........................ 257/291 |
| 5,684,547 A | * | 11/1997 | Park et al. | ...................... 359/59 |
| 5,847,780 A | * | 12/1998 | Kim et al. | ...................... 349/39 |
| 5,995,175 A | * | 11/1999 | Kim et al. | ...................... 349/43 |
| 6,441,401 B1 | * | 8/2002 | Jung et al. | ..................... 257/72 |

FOREIGN PATENT DOCUMENTS

KR    2000-0003116    1/2000

* cited by examiner

Primary Examiner—Mike Qi
(74) Attorney, Agent, or Firm—Morgan, Lewis & Bockius LLP (57) ABSTRACT

The present invention discloses a repair structure for a liquid crystal display and a method of repairing the same to repair a defect caused by a short circuit between a scan line and a data line. More specifically, a repair structure for a liquid crystal display having a substrate includes a scan line on the substrate, a data line crossing the scan line and having first, second, and third segments, wherein the second segment is an electrically isolated from the first and third segments and located at a portion where the scan line and the data line overlap, and a repair pattern electrically isolated from the second segment and electrically connecting the first segment with the third segment of the data line.

15 Claims, 12 Drawing Sheets

REPAIR STRUCTURE FOR LIQUID CRYSTAL DISPLAY AND METHOD OF REPAIRING THE SAME

This application claims the benefit of Korean Patent application No. P2000-23332 filed on May 1, 2000, which is hereby incorporated by reference.

BACKGROUND OF THE INVENTION

1. Field of the Invention

The present invention relates to a liquid crystal display (LCD), and more particularly, to a repair structure for an LCD and a method of repairing the same. Although the present invention is suitable for a wide scope of applications, it is particularly suitable for repairing a defect due to a short circuit between the lines of the LCD.

2. Discussion of the Related Art

A cathode ray tube (CRT) is a display device used as a monitor for information terminals and measuring instruments such as a TV. However, the CRT has not been widely applied in modern electronics due to its weight and size.

To substitute for such a CRT, an LCD having a small size and lightweight has been actively developed. Recently, the LCD has been developed for a flat panel display device. Thus, a demand of the LCD device is consistently increasing.

An amorphous silicon thin film transistor (TFT) is used as a switching element in a TFT-LCD that can be fabricated with a low cost and a high performance. Currently, the LCD is able to display a video graphic array (VGA) having a maximum high resolution of 640×480 pixels as well as an SVGA having a high resolution of 800×600 pixels and an XVGA having a high resolution of 1024×768 pixels.

Development and application of the TFT-LCD industries have been accelerated in accordance with an increase in dimension and resolution. To increase productivity and ensure a low cost, many efforts have been made in view of simplifying the process steps and improving yield.

A related art method for repairing an LCD device will now be described with reference to the accompanying drawings.

Figure 1:
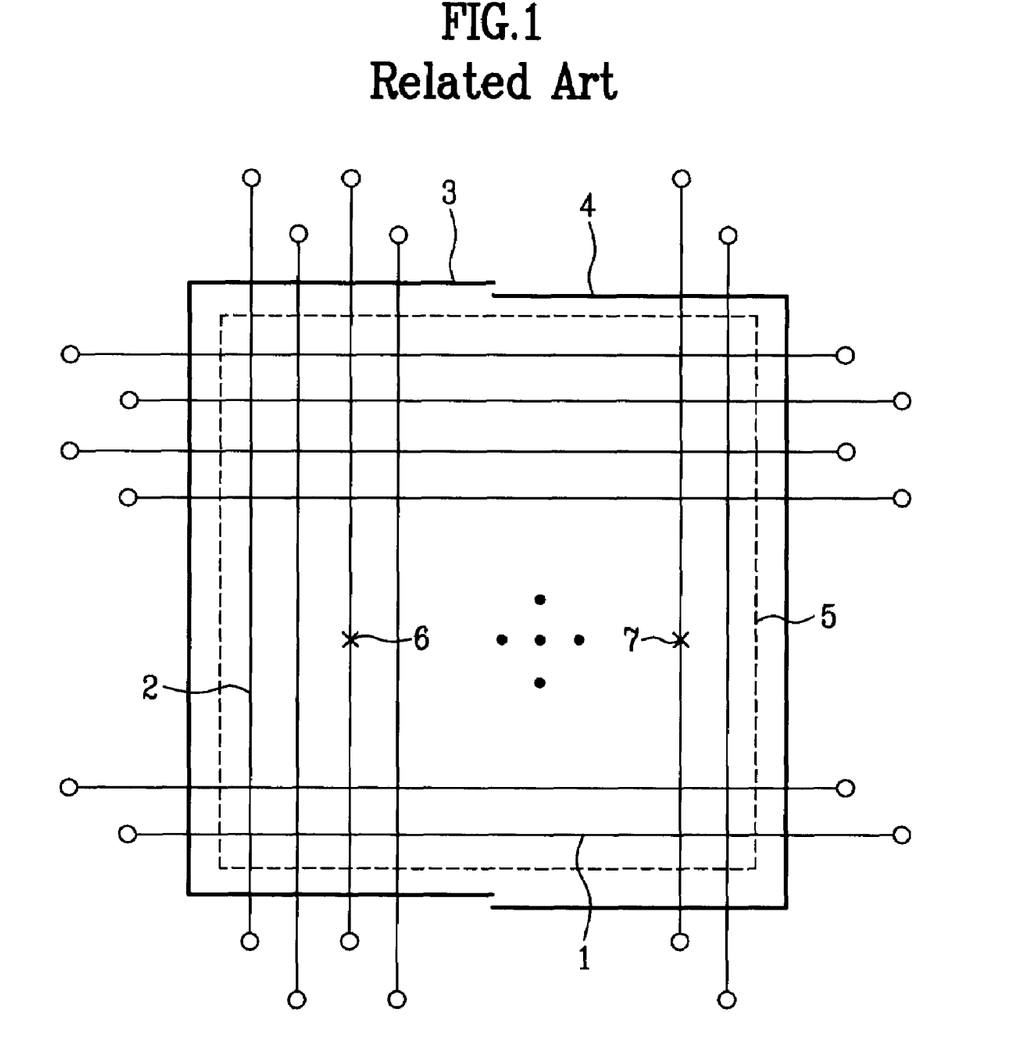
FIG. 1 is a plane view of an LCD illustrating a related art repair structure.

As shown in FIG. 1, a plurality of scan lines 1 are arranged on an insulating substrate at constant intervals and a plurality of data lines 2 are arranged to cross the respective scan lines 1, so that pixel regions are defined in a matrix arrangement. A thin film transistor (TFT) (not shown) and a pixel electrode (not shown) are arranged in each pixel region to constitute a TFT-LCD array 5.

The TFT-LCD array 5 surrounded by repair lines 3 and 4 has a closed circuit or two open points. As shown in FIG. 1, if the repair lines 3 and 4 having two open points are formed, they are separated from each other at a constant interval in the opposing portion.

For example, if a line opening 6 occurs in the data lines 2, the repair line 3 is electrically connected with one side of the opened data line 2 at one side of the TFT-LCD array 5. The repair line 3 is also electrically connected with the other side of the opened data line 2 at the other side of the TFT-LCD array 5. Thus, a signal to be applied to the opened data line is transmitted thereto through the repair line 3, thereby repairing the line opening 6 of the data line 2.

However, the related art repair structure for an LCD device and a method for repairing the same have the following problems.

If the repair lines are formed along the periphery of the TFT-LCD array, a resistance of the repair lines is significant. Moreover, in light of increase of the panel size, there is a limitation in forming the repair lines along the periphery of the TFT-LCD array.

In addition, if a defect occurs in respective lines such as scan lines or data lines, the respective lines with the defect can be repaired. However, if a defect occurs due to a short circuit between the scan line and the data line, the lines with the defect cannot be repaired. As a result, it is difficult to improve yield in fabricating an LCD.

SUMMARY OF THE INVENTION

Accordingly, the present invention is directed to a repair structure for an LCD device and a method for repairing the same that substantially obviate one or more of the problems due to limitations and disadvantages of the related art.

An object of the present invention is to provide a repair structure for an LCD device and a method for repairing the same in which a repair line in a portion where a gate line and a data line cross each other within a TFT-LCD array to repair a short circuit between a scan line and the data line by a laser induced chemical vapor deposition (CVD) method, thereby improving yield.

Additional features and advantages of the invention will be set forth in the description that follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a repair structure for a liquid crystal display having a substrate includes a scan line on the substrate, a data line crossing the scan line and having first, second, and third segments, wherein the second segment is an electrically isolated from the first and third segments and located at a portion where the scan line and the data line overlap, and a repair pattern electrically isolated from the second segment and electrically connecting the first segment with the third segment of the data line.

In another aspect of the present invention, a repair structure for a liquid crystal display having a substrate includes a data line on the substrate, a scan line crossing the scan line and having first, second, and third segments, wherein the second segment is an electrically isolated from the first and third segments and located at a portion where the scan line and the data line overlap; and a repair pattern electrically isolated from the second segment and electrically connecting the first segment with the third segment of the scan line.

In another aspect of the present invention, a method of repairing a liquid crystal display having a plurality of scan lines and data lines which are arranged to cross each other includes the steps of electrically isolating a portion of the data lines that are short circuited with the scan lines where the data line and scan lines are overlapped, thereby forming first, second, and third segments of the data lines, wherein the isolated portion is the second segment, forming contact holes over each of the first and third segments of the data lines, and forming a repair pattern electrically connecting the first and third segments of the data lines through the contact holes, wherein the repair pattern is electrically isolated from the scan lines.

In a further aspect of the present invention, A method of repairing a liquid crystal display having a plurality of scan lines and data lines which are arranged to cross each other includes the steps of electrically isolating a portion of the scan lines that are short circuited with the data lines where the data line and scan lines are overlapped, thereby forming first, second, and third segments of the scan lines, wherein the isolated portion is the second segment, forming contact holes over each of the first and third segments of the scan lines, and forming a repair pattern electrically connecting the first and third segments of the scan lines through the contact holes, wherein the repair pattern is electrically isolated from the data lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 2:
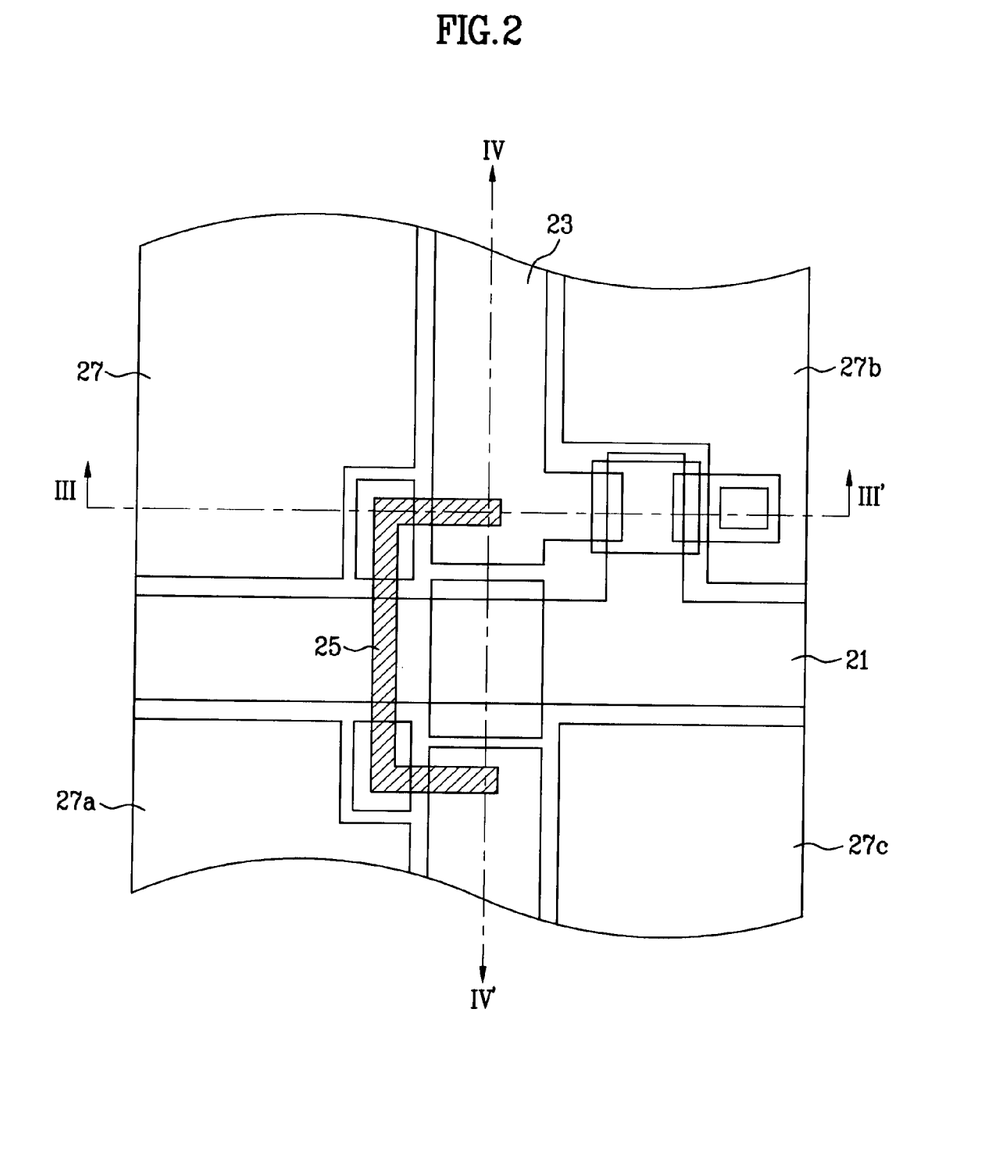
FIG. 2 is a plane view of an LCD illustrating a repair structure according to a first embodiment of the present invention.

FIG. 2 is a plane view of an LCD illustrating a repair structure according to a first embodiment of the present invention. In this embodiment, a data line is repaired when a short circuit occurs between a scan line and the data line.

More specifically, the repair structure according to the first embodiment includes a scan line 21 formed in one direction, a data line 23 arranged to cross the scan line 21 and cut at both sides of the scan line 21, a contact hole (not shown) formed in each of the cut data lines 23, and a repair pattern 25 insulated from the scan line 21, for electrically connecting the cut data lines 23 with each other through the contact hole.

The repair pattern 25 is bypassed toward pixel electrodes 27 and 27a adjacent to the data line 23 to overlap the pixel electrodes 27 and 27a. The data line 23 is cut by a laser.

As shown in FIG. 2, since the repair pattern 25 is formed in a "[" shape, the pixel electrode 27 electrically connected with the repair pattern 25 is cut by a laser. At this time, both the pixel electrodes 27 and 27a at the upper and lower portions around the scan line 21 may be cut. Alternatively, any one of the pixel electrodes 27 and 27a may be cut as shown in FIG. 2.

If any one of the pixel electrodes 27 and 27a is cut, the cut pixel electrode is normally operated. However, the uncut pixel electrode exists as a defective pixel electrode.

For example, the repair pattern 25 may be formed of a metal such as W, Mo, Ni, Cr, and Fe.

A method of repairing an LCD according to the first embodiment will now be described with reference to FIGS. 3A to 3D and FIGS. 4A to 4D.

FIGS. 3A to 3D are cross-sectional views taken along the line III-III' of FIG. 2 while FIGS. 4A to 4D are cross-sectional views taken along the line IV-IV' of FIG. 2.

Figure 3A:
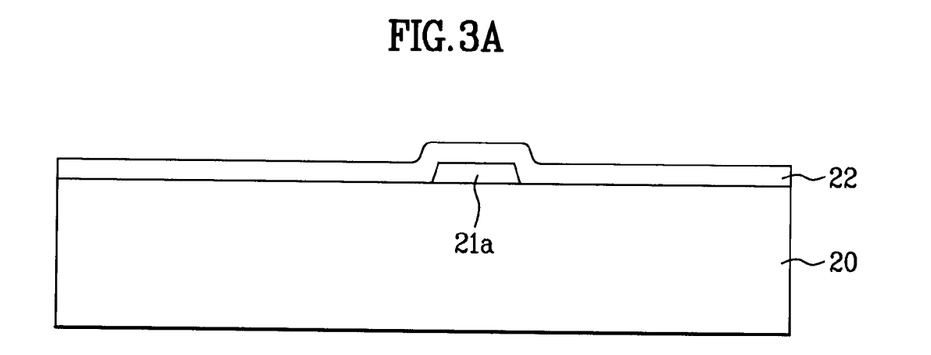
FIGS. 3A to 3D are cross-sectional views taken along the line III-III' of FIG. 2.
Figure 4A:
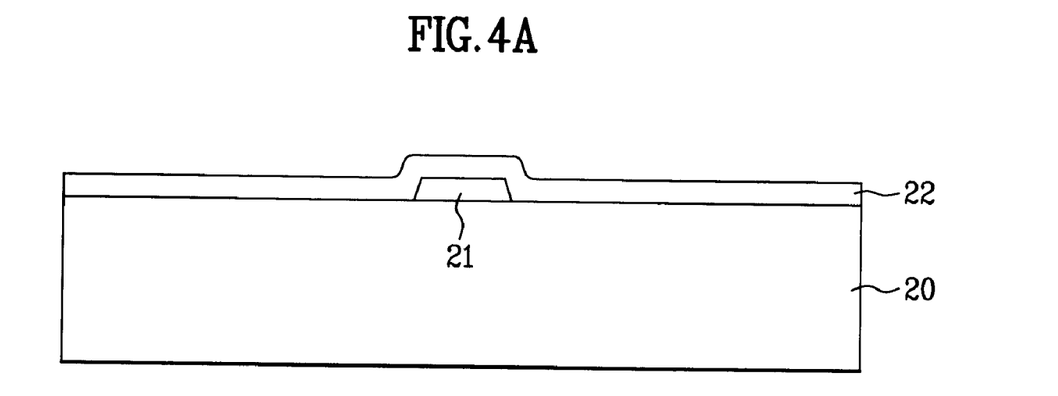
FIGS. 4A to 4D are cross-sectional views taken along the line IV-IV' of FIG. 2.

As shown in FIGS. 3A and 4A, a scan line 21 and a gate electrode 21a are formed on an insulating substrate 20. A gate insulating layer 22 is formed on the entire surface including the scan line 21 and the gate electrode 21a.

Figure 3B:
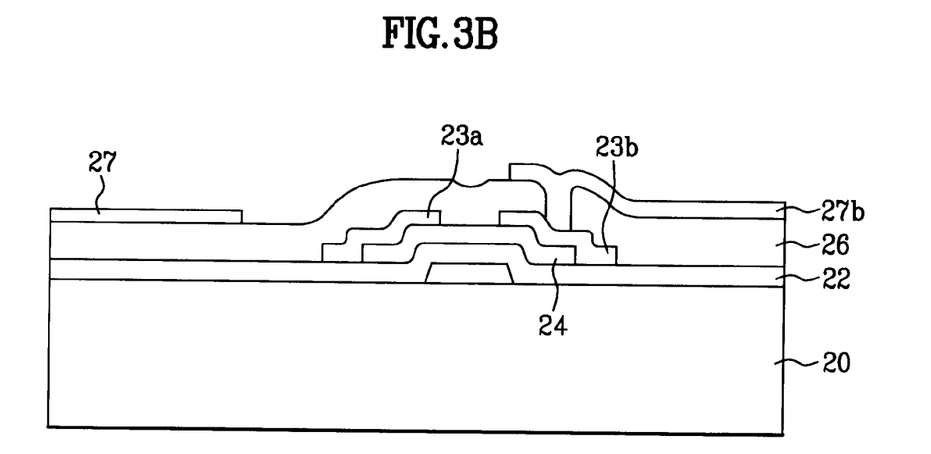
Figure 4B:
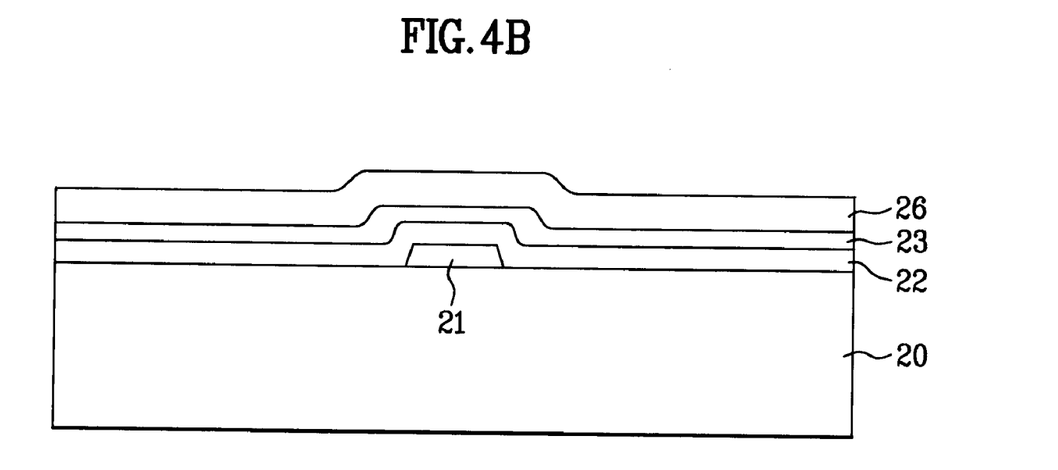

As shown in FIGS. 3B and 4B, a semiconductor layer 24 is deposited on the entire surface of the gate insulating layer 22 and then patterned to remain on the gate insulating layer 22 over the gate electrode 21a in an island shape. A data line 23 is formed to cross the scan line 21, and a drain electrode 23b is formed at the portion opposite to a source electrode 23a, extended from the data line 23, on the semiconductor layer 24.

Afterwards, a passivation layer 26 is formed on the entire surface including the data line 23 and the source and drain electrodes 23a and 23b. A pixel electrode 27b is formed to electrically connect with the drain electrode 23b. Then, a TFT-LCD array having thin film transistors and pixel electrodes is completed.

The reference numeral 27 of FIG. 3B, which is not described above, denotes a pixel electrode.

As described above, in the TFT-LCD array having TFTs and pixel electrodes, when a short circuit is generated between the gate line and the data line, a repair process is performed as follows.

Figure 3C:
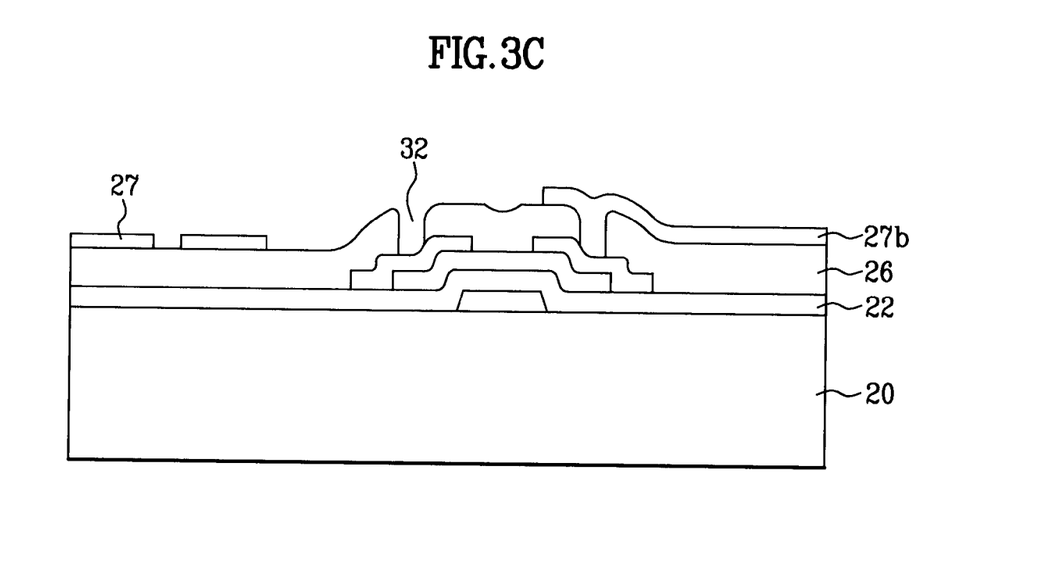
Figure 4C:
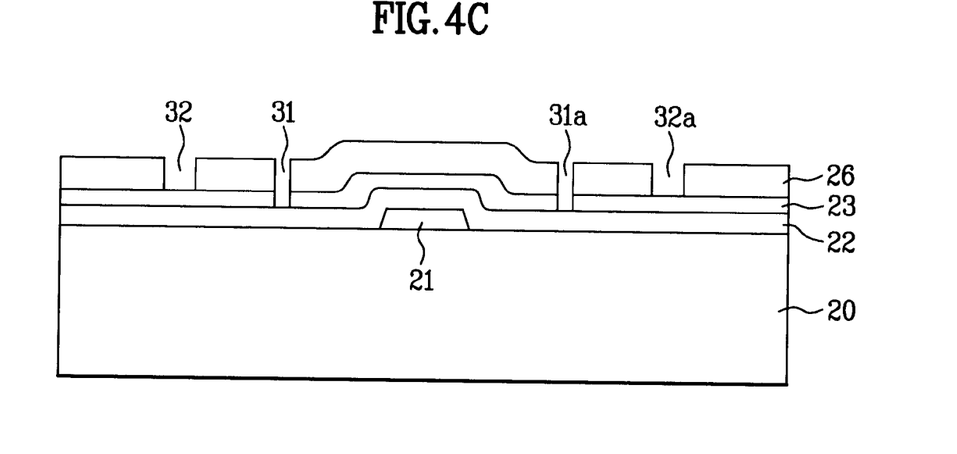

As shown in FIGS. 3C and 4C, when a short circuit between the scan line 21 and the data line 23 occurs in the portion where the scan line 21 and the data line 23 cross each other, the data line 23 at both sides of the scan line 21 is cut by a laser to form opening regions 31 and 31a. Contact holes 32 and 32a are formed using a laser to expose a predetermined portion of the data line 23 at both sides of the scan line 21. The pixel electrode 27 is then cut by a laser.

Figure 3D:
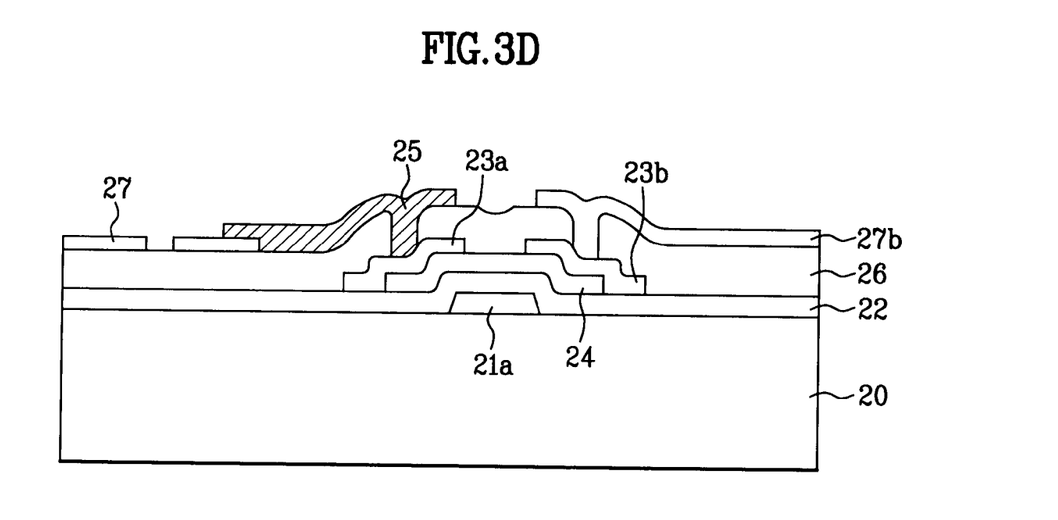
Figure 4D:
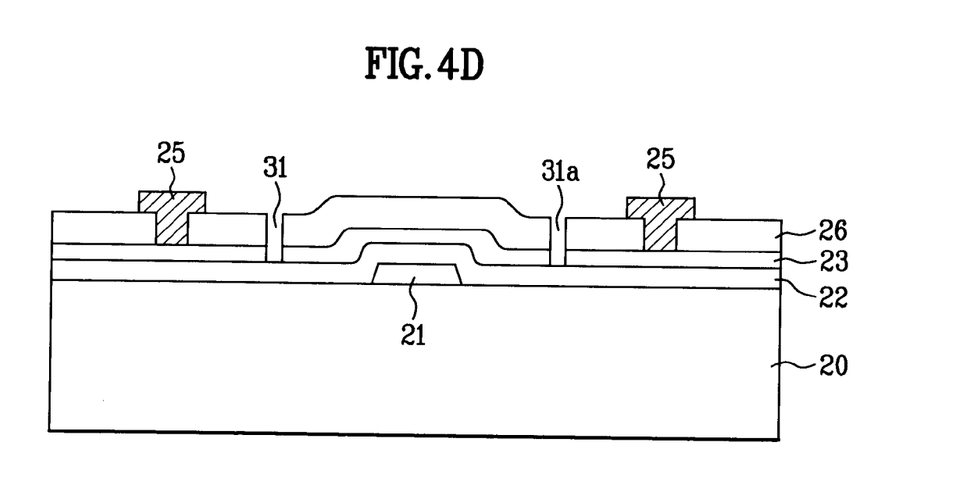

As shown in FIGS. 3D and 4D, a repair pattern 25 is formed by a laser induced CVD method to connect to the data line 23 at both sides of the scan line 21 through the contact holes 32 and 32a. Thus, the repair process of the LCD according to the first embodiment of the present invention is completed.

The repair pattern 25 is bypassed to the pixel electrode 27 adjacent to the data line 23 to overlap the pixel electrode 27. If the repair pattern 25 is formed along the upper portion of the data line 23, the repair pattern 25 is buried in the open regions 31 and 31a. For this reason, the scan line can be electrically connected to the data line 23.

Accordingly, to prevent the scan line from being electrically connected to the data line 23, the repair pattern 25 should not be formed along the data line 23 but bypasses to the pixel electrodes 27 and 27a.

At this time, as shown in FIGS. 2 and 3D, since the repair pattern 25 is electrically connected to the pixel electrodes 27 and 27a, it is necessary to cut the pixel electrodes 27 and 27a using a laser. As shown in FIG. 2, if only the pixel electrode 27 over the scan line 21 is cut, the cut pixel electrode is normally operated but the pixel electrode 27a below the scan line 21 (which is not cut) exists as a defect pixel electrode.

If both the pixel electrodes 27 and 27a over and below the scan line 21 are cut, they are normally operated.

For example, the repair pattern 25 may be formed of a metal such as W, Mo, Ni, Cr, and Fe.

As described above, in the first embodiment of the present invention, if the scan line 21 and the data line 23 are electrically short-circuited, the data line 23 at both sides of the scan line 21 is cut by a laser and the repair pattern 25, which directly connects the cut data lines with each other, is formed by a laser CVD method.

The repair structure for an LCD and a method of repairing the same according to a second embodiment of the present invention will now be described with reference to FIG. 5.

Figure 5:
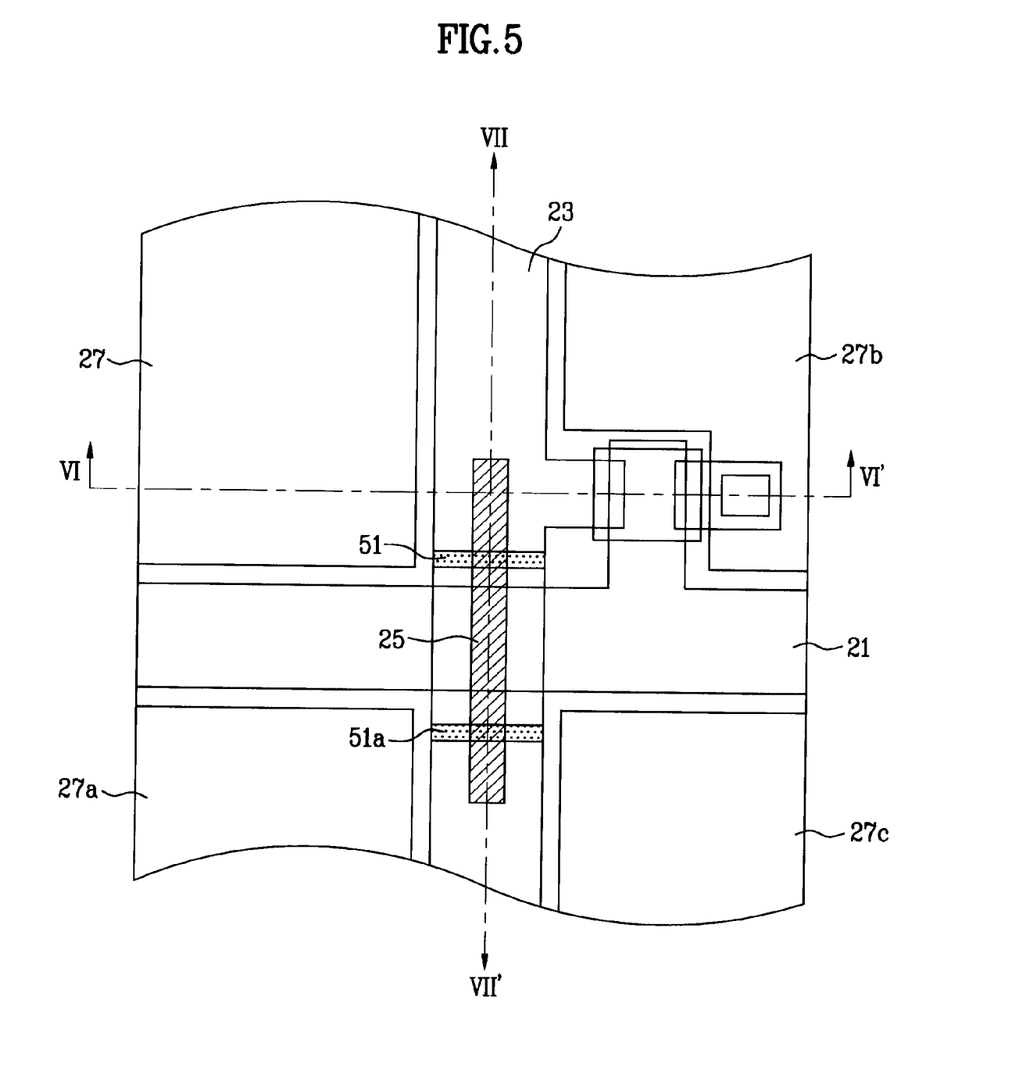
FIG. 5 is a plane view of an LCD illustrating a repair structure according to a second embodiment of the present invention.

As shown in FIG. 5, in the repair structure according to the second embodiment of the present invention, a repair pattern 25 does not bypass to pixel electrodes 27 and 27a but formed along a data line 23 at the upper portion of the data line 23.

To form the repair pattern 25 at the upper portion of the data line 23, it is necessary to bury opening regions of the data line 23 with an insulating material 51 and 51a. In other words, if the opening regions are not buried with the insulating material 51 and 51a, the metal used as the repair pattern 25 is buried in the opening regions. For this reason, the data line 23 short-circuited from the scan line 21 may be electrically connected to the scan line 21. Accordingly, the opening regions should be buried with the insulating material 51 and 51a.

The above-mentioned features will be described in more detail with reference to FIGS. 6A to 6D and FIGS. 7A to 7D.

FIGS. 6A, 6B, 7A, and 7B illustrate a manufacturing process for forming a TFT. Since the process for forming a TFT has been described in the first embodiment of the present invention, the description will be omitted in the second embodiment.

Figure 6A:
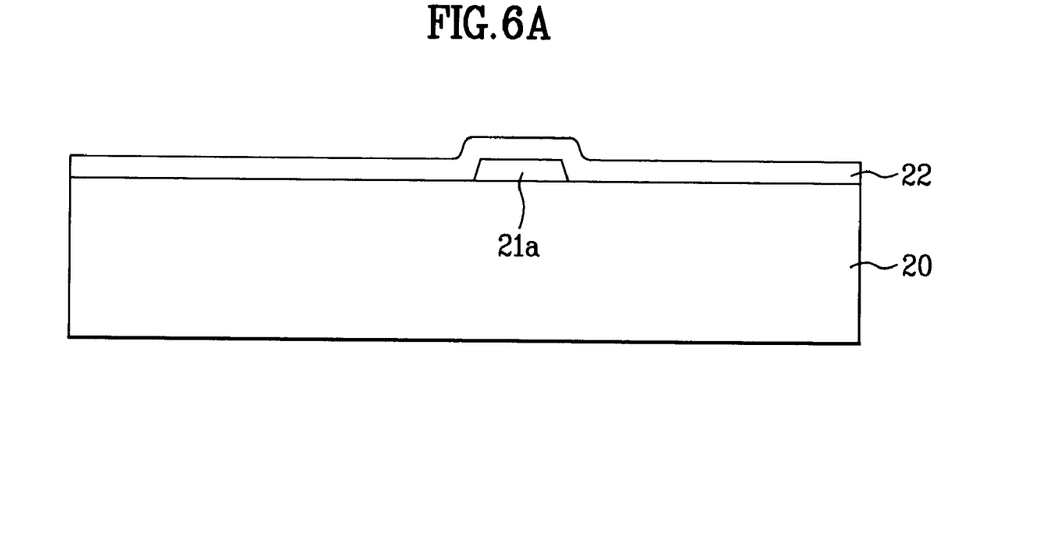
FIGS. 6A to 6D are cross-sectional views taken along the line VI-VI' of FIG. 5.
Figure 6B:
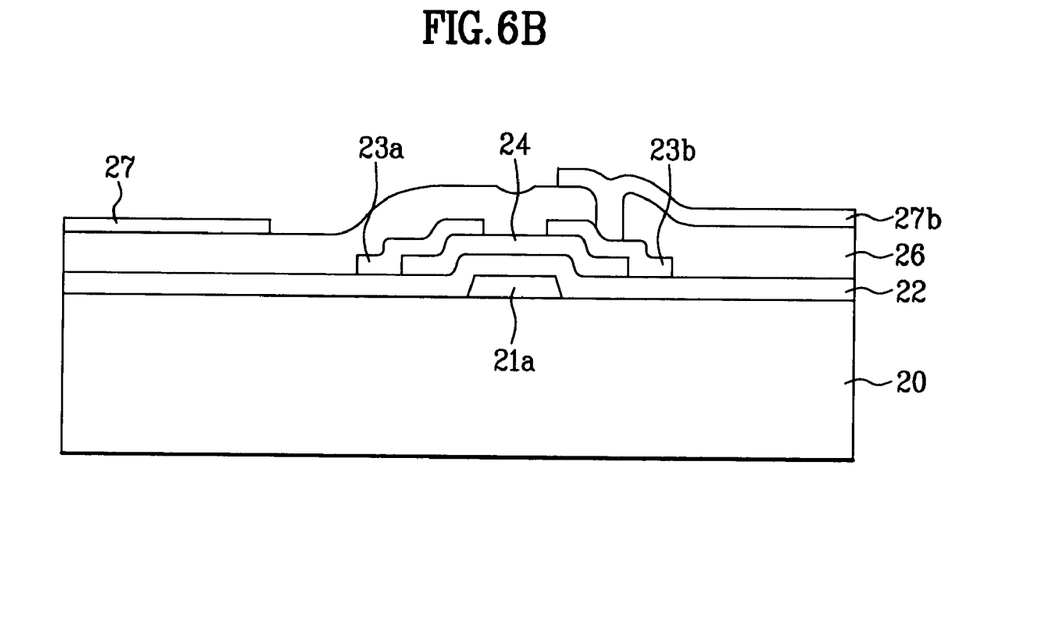
Figure 7A:
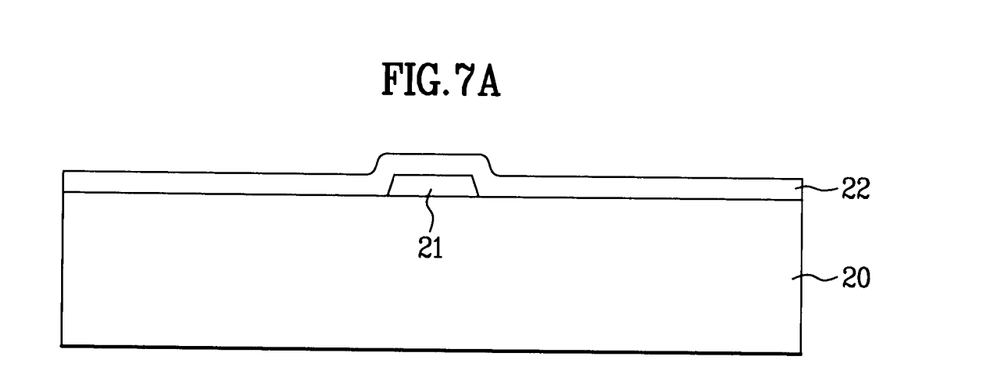
FIGS. 7A to 7E are cross-sectional views taken along the line VII-VII' of FIG. 5.
Figure 7B:
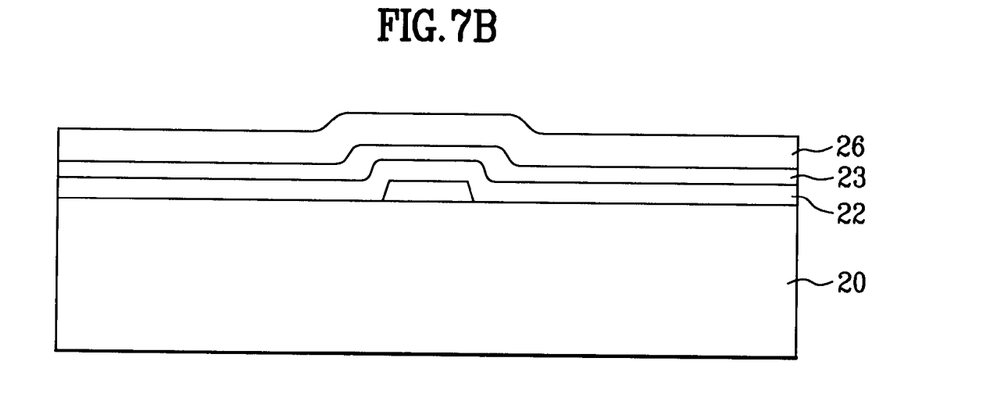

As shown in FIGS. 6B and 7B, a TFT-LCD array is formed to have a TFT and pixel electrodes. When a short-circuit between a scan line and a data line occurs in the portion where the scan line and the data line cross each other a repair process of the second embodiment is performed as follows.

Figure 7C:
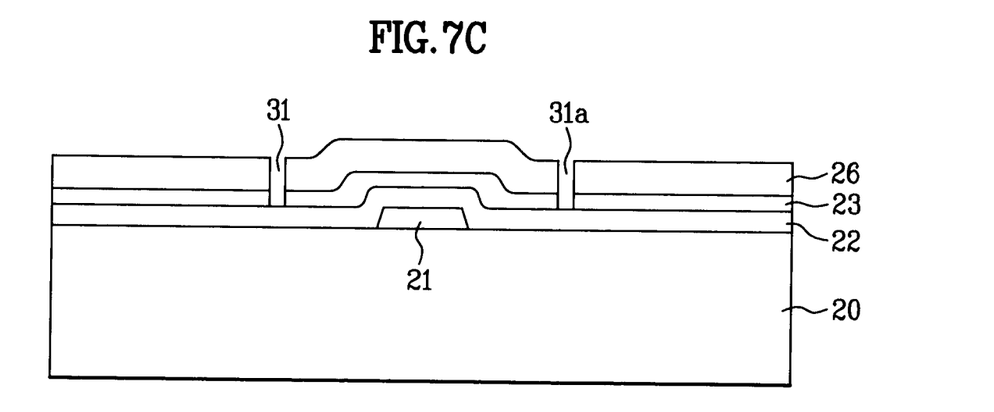

In FIG. 7C, the data line 23 at both sides of the scan line 21 is cut by a laser, thereby forming opening regions 31 and 31a.

Figure 6C:
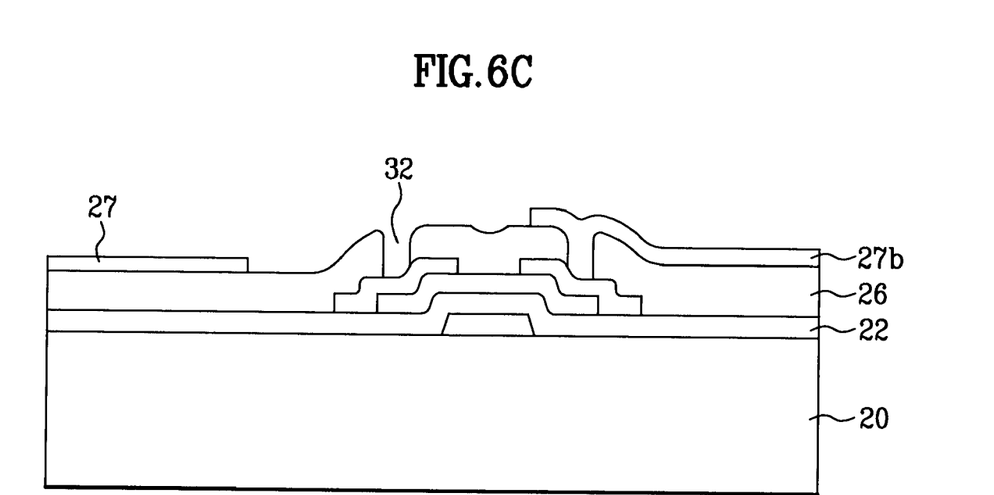
Figure 7D:
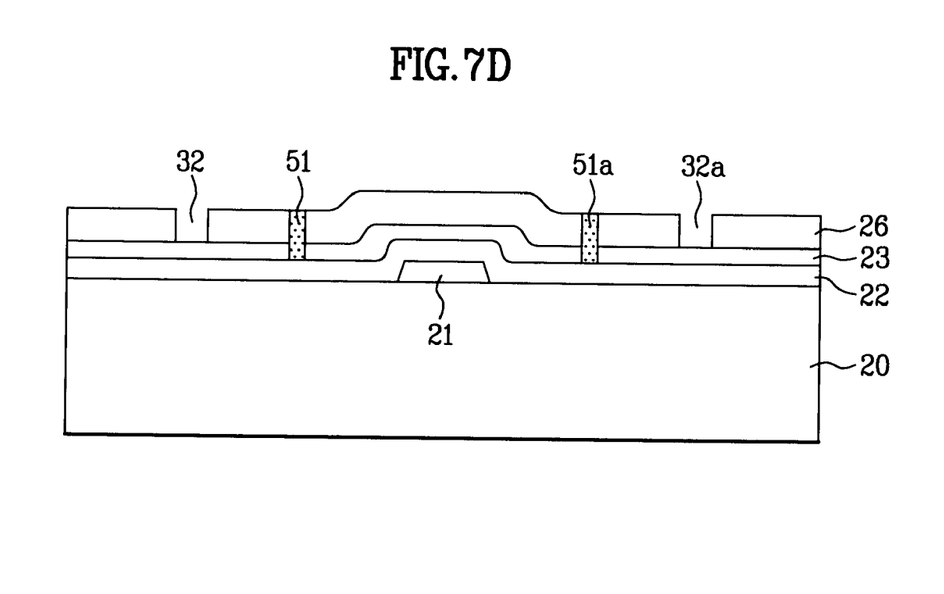

As shown in FIGS. 6C and 7D, insulating materials 51 and 51a are filled in the opening regions 31 and 31a. Thereafter, contact holes 32 and 32a are formed by a laser to expose a predetermined portion of the data line 23 at both sides of the scan line 21.

Figure 6D:
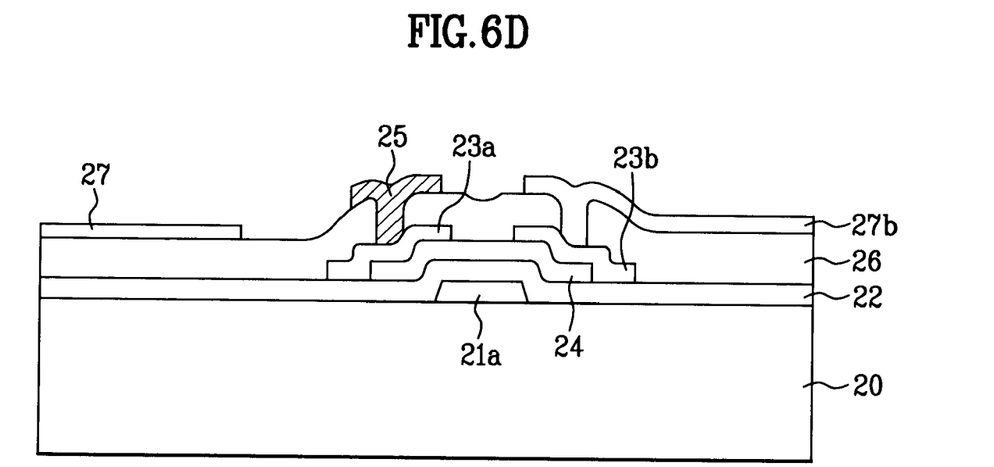
Figure 7E:
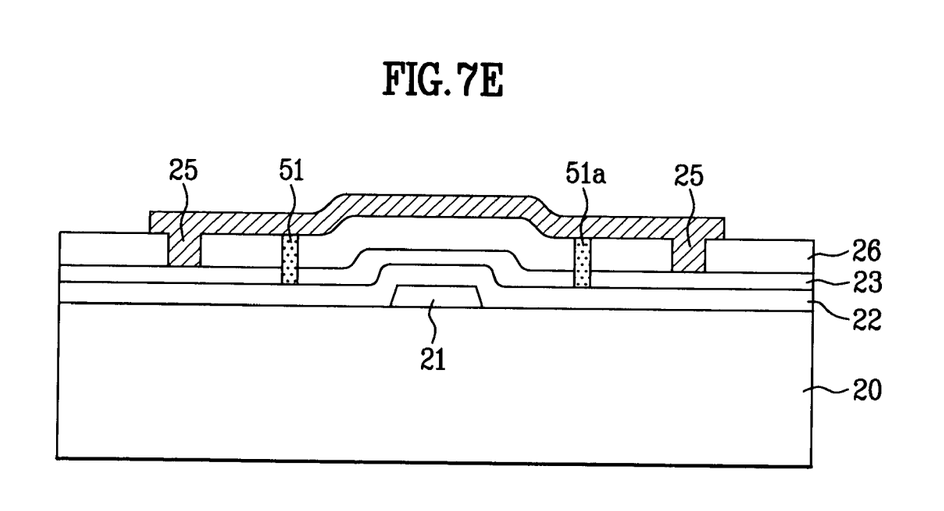

FIGS. 6D and 7E illustrate that a repair pattern 25 is formed on a passivation layer 26 over the data lines 23 along the data line 23 by the laser CVD method. The data lines 23 at both sides of the scan line 21 are connected with each other through the contact holes 32 and 32a. Thus, the repair process of the LCD device according to the second embodiment of the present invention is completed.

For example, the repair pattern 25 may be formed of a metal such as W, Mo, Ni, Cr, and Fe.

In the second embodiment of the present invention, the repair pattern 25 does not bypass to the pixel electrodes 27 and 27a but formed along the data lines 23 at the upper portion of the data lines 23. Accordingly, it is not necessary to cut some of the pixel electrodes 27 and 27a adjacent to the data lines 23. As a result, the pixel electrodes have no defect in this embodiment.

Meanwhile, in the first and second embodiments of the present invention, if a short-circuit occurs between the scan lines and the data lines, only the data lines are cut. In a third embodiment of the present invention, only scan lines may be cut in repairing a short-circuit.

Figure 8:
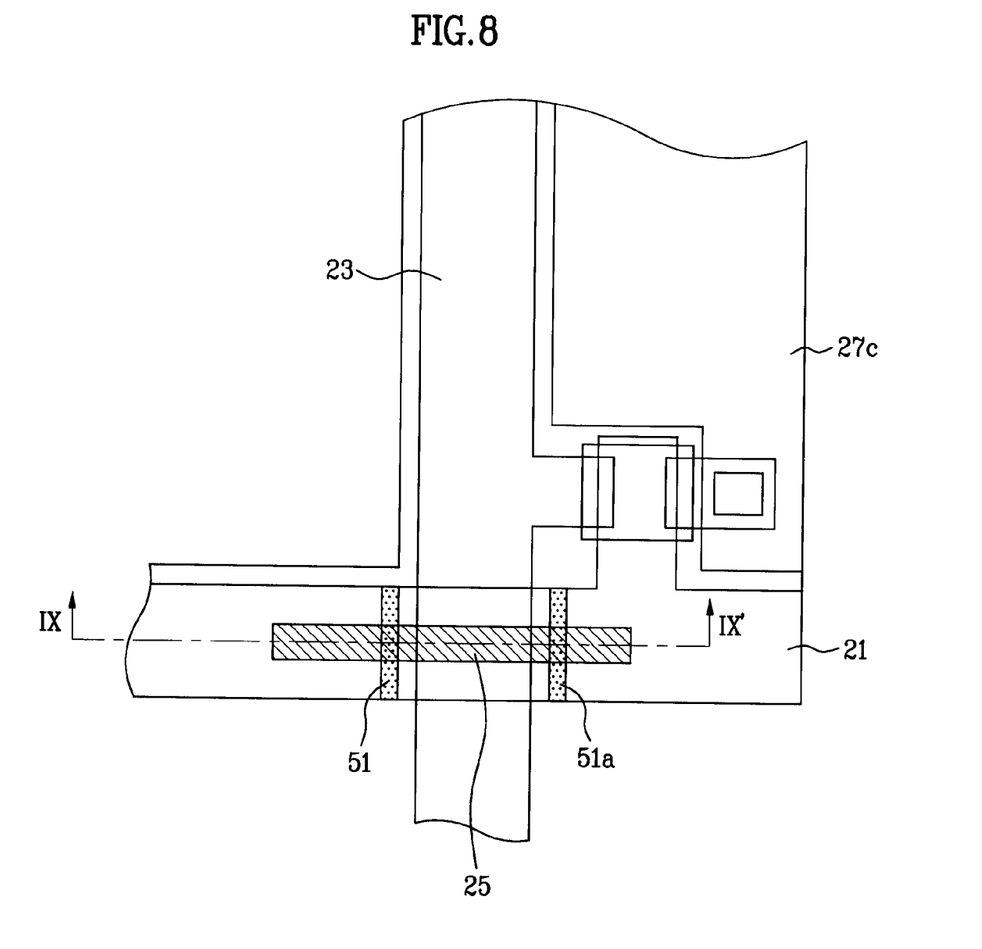
FIG. 8 is a plane view of an LCD illustrating a repair structure according to a third embodiment of the present invention.
Figure 9:
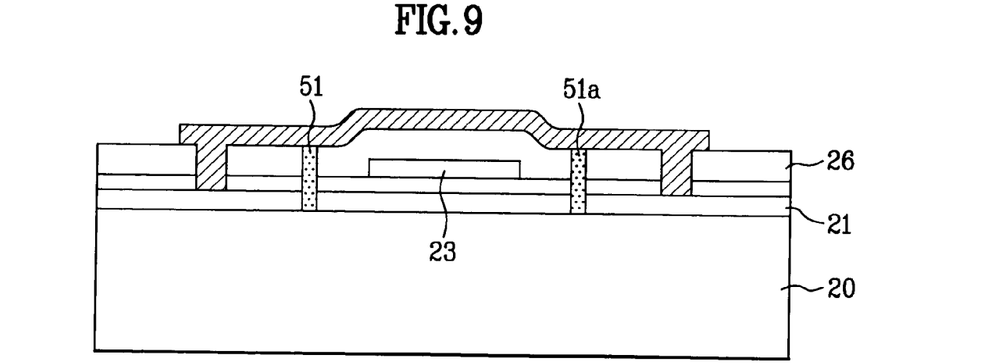
FIG. 9 is a cross-sectional view taken along the line IX-IX' of FIG. 8.

FIG. 8 is a plane view of an LCD illustrating a repair structure according to the third embodiment of the present invention while FIG. 9 is a cross-sectional view taken along the line IX-IX' of FIG. 8.

As shown in FIGS. 8 and 9, the scan line 21 arranged to cross the data line 23 at the lower portion of the data line 23 is cut using a laser at both sides of the data line 23. Then, contact holes are formed using a laser to expose the scan lines 21 at both sides of the data line 23.

Afterwards, the cut portions are buried with the insulating material 51 and 51a and then the repair pattern 25 is formed by a laser CVD method to connect with the scan lines through the contact holes.

As described above, unlike the first and second embodiments of the present invention, the scan line 21 arranged to cross the data line 23 is cut at both sides of the data line 23 in the third embodiment. Thereafter, the repair pattern 25 is formed along the scan line 21 at the upper portion of the scan line 21.

As aforementioned, the repair structure for an LCD and the method for repairing the same according to the present invention have the following advantages.

A repair pattern is selectively formed at the portion where a short-circuit between the lines occurs. Therefore, with increase in size of the panel, resistance of the repair pattern does not increase.

In addition, since the repair pattern is readily formed by laser induced CVD, defects due to a short-circuit between the scan line and the data line are repaired. As a result, yield is much improved.

It will be apparent to those skilled in the art that various modifications and variations can be made in the method of the repair structure for the liquid crystal display and the method of repairing the same of the present invention without departing from the spirit or scope of the inventions. Thus, it is intended that present invention covers the modifications and variations of this invention provided they come within the scope of the appended claims and their equivalents.

What is claimed is:

1. A repair structure for a liquid crystal display having a substrate, comprising:
    a scan line on the substrate;
    a data line crossing the scan line and having first, second, and third segments, wherein the second segment is electrically isolated from the first and third segments and located at a portion where the scan line and the data line overlap; and
    a repair pattern electrically isolated from the second segment and electrically connecting the first segment with the third segment of the data line, wherein the repair pattern bypasses to pixel electrodes adjacent to the data line and has a portion overlapping the pixel electrodes.

2. The repair structure according to claim 1, wherein a portion of the pixel electrodes overlapped the repair pattern is electrically isolated from other portions of the pixel electrodes.

3. The repair structure according to claim 1, wherein the repair pattern is formed along an upper portion of the data line.

4. The repair structure according to claim 1, further comprising an insulating material formed between the first and second segments of the data line and the second and third segments of the data line.

5. The repair structure according to claim 1, wherein the repair pattern has a "[" shape.

6. The repair structure according to claim 1, wherein the repair pattern has an "I" shape.

7. The repair structure according to claim 1, wherein the repair pattern is formed of metal.

8. A method of repairing a liquid crystal display having a plurality of scan lines and data lines which are arranged to cross each other, the method comprising the steps of:
    electrically isolating a portion of the data lines that are short circuited with the scan lines where the data lines and scan lines are overlapped, thereby forming first, second, and third segments of the data lines, wherein the isolated portion is the second segment;
    forming contact holes over each of the first and third segments of the data lines;
    forming a repair pattern electrically connecting the first and third segments of the data lines through the contact holes, wherein the repair pattern is electrically isolated from the scan lines; and
    forming an insulating material to fill portions between the first and second segments of the data lines and between the second and third segments of the data lines.

9. The method according to claim 8, wherein the step of electrically isolating a portion of the data lines is carried out by a laser.

10. The method according to claim 8, wherein the contact holes are formed by using a laser.

11. The method of claim 8, wherein the repair pattern is formed by laser induced chemical vapor deposition.

12. A method of repairing a liquid crystal display having a plurality of scan lines and data lines which are arranged to cross each other, the method comprising the steps of:
    electrically isolating a portion of the scan lines that are short circuited with the data lines where the data lines and scan lines are overlapped, thereby forming first, second, and third segments of the scan lines, wherein the isolated portion is the second segment;
    forming contact holes over each of the first and third segments of the scan lines;
    forming a repair pattern electrically connecting the first and third segments of the scan lines through the contact holes, wherein the repair pattern is electrically isolated from the data lines; and
    forming an insulating material to fill portions between the first and second segments of the scan lines and between the second and third segments of the scan lines.

13. The method according to claim 12, wherein the step of electrically isolating a portion of the scan lines is carried out by a laser.

14. The method according to claim 12, wherein the contact holes are formed by using a laser.

15. The method of claim 12, wherein the repair pattern is formed by laser induced chemical vapor deposition.

* * * * *